United States Patent
Austin et al.

(10) Patent No.: US 6,986,638 B2
(45) Date of Patent: Jan. 17, 2006

(54) VANE FOR A ROTOR ARRANGEMENT FOR A GAS TURBINE ENGINE

(75) Inventors: Gary P Austin, Derby (GB); Czeslaw Paluszkiewicz, Loughborough (GB); Benjamin A Leishman, Cambridge (GB); Nicholas A Cumpsty, Derby (GB)

(73) Assignee: Rolls-Royce plc, London (GB)

( * ) Notice: Subject to any disclaimer, the term of this patent is extended or adjusted under 35 U.S.C. 154(b) by 62 days.

(21) Appl. No.: 10/389,989

(22) Filed: Mar. 18, 2003

(65) Prior Publication Data

US 2004/0028529 A1 Feb. 12, 2004

(30) Foreign Application Priority Data

Mar. 23, 2002 (GB) .............................. 0206880

(51) Int. Cl.
*F01D 5/14* (2006.01)

(52) U.S. Cl. .................... 415/115; 415/144; 416/193 A

(58) Field of Classification Search ................ 415/115, 415/144; 416/193 A
See application file for complete search history.

(56) References Cited

U.S. PATENT DOCUMENTS

| | | | |
|---|---|---|---|
| 3,142,438 A | * | 7/1964 | McKenzie .................. 415/144 |
| 4,302,148 A | | 11/1981 | Tubbs |
| 4,463,552 A | | 8/1984 | Monhardt |
| 4,546,605 A | * | 10/1985 | Mortimer et al. .......... 60/226.1 |
| 5,059,093 A | * | 10/1991 | Khalid et al. ............... 415/115 |
| 5,105,616 A | | 4/1992 | Bornemisza |
| 5,209,633 A | * | 5/1993 | McGreehan et al. ........ 415/144 |
| 5,531,565 A | | 7/1996 | Meindl |
| 6,109,868 A | * | 8/2000 | Bulman et al. ............. 415/144 |
| 6,578,351 B1 | * | 6/2003 | Modafferi .................... 415/144 |

FOREIGN PATENT DOCUMENTS

| | | |
|---|---|---|
| EP | 993476 P | 5/1965 |
| EP | 1136679 A | 9/2001 |

* cited by examiner

*Primary Examiner*—Edward K. Look
*Assistant Examiner*—Igor Kershteyn
(74) *Attorney, Agent, or Firm*—W. Warren Taltavull; Manelli Denison & Selter PLLC

(57) ABSTRACT

A vane (20) for a rotor arrangement (14) of a gas turbine engine (10) comprises an aerofoil member (34) and a mounting member (23) from which the aerofoil member (34) extends. The mounting member (23) includes a sloped region (46, 62) to guide gas flowing over the mounting member (23) into a bleed arrangement (30). A vane assembly (19) and a rotor arrangement (14) comprising such vanes (20) are also disclosed.

28 Claims, 8 Drawing Sheets

VANE FOR A ROTOR ARRANGEMENT FOR A GAS TURBINE ENGINE

FIELD OF THE INVENTION

This invention relates to vanes for rotor arrangements for gas turbine engines. More particularly, but not exclusively, the invention relates to stator vanes for use in gas turbine engines, for example compressors and rotor arrangements using such vanes.

BACKGROUND OF THE INVENTION

In the high pressure compressor of a gas turbine engine, bleed off-takes are provided to remove air from the compressor to assist with the handling of the compressor and to cool the high pressure turbine. In known high pressure compressors, the bleed off-take is in the form of an array of apertures defined in the vane outer platform extending circumferentially around the compressor.

SUMMARY OF THE INVENTION

According to one aspect of this invention, there is provided a vane for a rotor arrangement of a gas turbine engine, the vane comprising an aerofoil member and a mounting member from which the aerofoil member extends, the mounting member including an inclined region to guide gas flowing over the mounting member into a bleed arrangement.

Preferably, the mounting member includes first and second oppositely facing surfaces, the aerofoil member extending from the first surface. The inclined region is preferably in the form of a ramp, and may slope from the first surface towards the second surface in a downstream direction relative to the direction of the intended flow of gas across the mounting member. In one embodiment, the inclined region terminates at said second surface. In another embodiment, the inclined region terminates between said first and second surfaces.

The inclined region is desirably inclined relative to the main axis of the rotor arrangement. The angle of said inclined region to said main axis may be between substantially 5° and substantially 30°, more preferably between substantially 7° and substantially 13°.

In one embodiment, the inclined region is generally planar. In another embodiment, the inclined region is curved relative to the main axis of the rotor arrangement and may present a convex face towards said aerofoil member. The curved inclined region may have an upstream gentle slope and a downstream steeper slope. Preferably, the curved region is in profile, substantially elliptical.

Preferably, the mounting member defines a recess to allow gas to enter the bleed arrangement, and the inclined region desirably constitutes an entry region to the recess to guide said gas into the recess.

In a first embodiment, the recess is defined inwardly from a side edge of the mounting member. In this first embodiment, the mounting member may surround said recess except along said side edge.

In an second embodiment, the recess may extend inwardly from a downstream edge of the mounting member to a side edge of the mounting member.

In one embodiment, the recess may be defined on one side of the aerofoil member. In another embodiment, the recess may be defined on the opposite side of the aerofoil member.

In a further embodiment, a recess may be defined on both sides of the aerofoil member.

Where each vane defines a single recess on one side of the aerofoil member, the vane is preferably arranged in use adjacent to, and in abutment with, a vane defining a recess in the mounting member on the opposite side of the aerofoil member. Advantageously, the two vanes are disposed such that the sides, defining the respective recesses are in abutment with each other such that said recesses define a bleed aperture or recess extending between the abutting mounting members to two adjacent vanes.

Where each vane defines a recess in the mounting member on both sides of the mounting member, each vane is preferably arranged in use adjacent two further vanes, one on each side. Each further vane preferably defines at least one recess in the mounting member. Said recess defined in each further vane is preferably defined on the side of the aerofoil member in abutment with the first mentioned vane. Thus, each recess in the mounting member of the first mentioned vane is aligned with a recess of an adjacent vane to define a bleed aperture or recess extending between the mounting member of the two adjacent vanes.

Each recess is preferably associated with a respective inclined region. The adjacent inclined regions may also be aligned with each other to provide a larger inclined region extending across the abutting mounting members;

The mounting member may be provided with a second inclined region, which may be provided between the first inclined region and the aerofoil member.

The second inclined region may be in the form of a ramp and may slope from the first surface of the mounting member towards the second face Preferably the second inclined region terminates between said first and second surfaces.

The second inclined region preferably slopes from the first surface towards the second surface in a downstream direction relative to the direction to the intended flow of gas across the mounting member.

The second inclined region is desirably inclined relative to the main axis of the rotor arrangement.

The second inclined region may extend from a region between the upstream and downstream edges of the mounting member towards the downstream edge of the mounting member. Preferably, the second inclined region extends to file downstream edge of the mounting member.

Preferably, the second inclined region makes an angle of between substantially 0° and 10° with the main axis of the rotor arrangement.

In another embodiment an edge preferably extends between the second inclined region and the first inclined region, and may also extend between the second inclined region and the recess. The side edge is preferably rounded, which has the advantage of allowing a gradual change in direction of gas flowing across the edge thereby reducing or preventing disruption or the flow of gas.

The second inclined region may include a downstream section extending across the downstream end of the mounting member. Where the vane includes two of said second inclined regions, one on each side of the aerofoil member said downstream section may extend from one of said second inclined regions to the other of said second inclined regions.

Preferably, each of the second inclined regions makes an angle of between substantially 0° and 10° with the main axis of the rotor arrangement.

The aforesaid rounded edge may extend along the downstream section of the second inclined region.

A connecting portion may extend from the first inclined region to the second inclined region. The connecting portion may present a concave face to the aerofoil member.

According to another aspect of the invention the is provided a vane assembly for a gas turbine engine, said vane assembly comprising a plurality of vanes as described in the third to the twenty-fourth paragraph above arranged in an annular array.

According to another aspect of this invention there is provided a rotor arrangement for a gas turbine engine, the arrangement comprising a vane assembly comprising a plurality of vanes arranged in an annular array each vane having an aerofoil member, the arrangement further including a rotor blade assembly downstream of the vane assembly, the rotor blade assembly comprising a plurality of rotor blades arranged in an annular array on a rotary support member, and an annular surface arrangement extending around the aerofoil members and the rotor blade assembly, the surface arrangement defining outlet means upstream of the rotor blade assembly through which gas can flow to a bleed arrangement, wherein the Surface arrangement further includes a plurality of inclined regions, each inclined region being associated with thy outlet means to guide gas flowing over the surface arrangement into the outlet means.

The outlet means may define a plurality of apertures arranged in an annular array or a single annular apertures extending around the surface arrangement.

Preferably, the surface arrangement includes a first surface extending around the vane assembly, and a second surface extending around the rotor blade assembly.

Where the outlet means comprises a plurality of apertures, each inclined region is associated with a respective one of the apertures. Where the outlet means comprises a single annular aperture, each inclined region is associated with said annular aperture.

In a first embodiment, the outlet means is provided downstream of the vane assembly. In this embodiment each inclined region extends from between adjacent vanes to the outlet means.

In a second embodiment, each of the plurality of apertures is defined between adjacent vanes.

Preferably, each of the vanes comprises a mounting member and an aerofoil member extending therefrom wherein the mounting members of the plurality of vanes arranged in said annular array constitute said first surface extending around the vane assembly. The second surface can be provided by a casing extending around the rotor assembly.

Preferably, the vane assembly is as described in the twenty-fifth paragraph above.

According to a further aspect of this invention there is provided a rotor arrangement for a gas turbine engine, the arrangement comprising a vane assembly comprising a plurality of vanes arranged in an annular array, each vane having an aerofoil member, the arrangement further including a rotor blade assembly downstream of the vane assembly, the rotor blade assembly comprising a plurality of rotor blades arranged in an annular array on a rotary support member, and an annular surface arrangement extending around the vane assembly and the rotor blade assembly, wherein the surface arrangement defines outlet means upstream of the rotor blade assembly through which gas can flow to a bleed arrangement, the surface arrangement including a first surface extending around the vane assembly and a second surface extending around the rotor blade assembly, the radius of the first surface being greater than the radius of the second surface.

Preferably, the vane assembly is as described in the twenty-fifth paragraph above. In the preferred embodiment, the mounting members of the plurality of vanes arranged in said annular array provide said first surface extending around the aerofoil members. The second surface may be provided by a casing extending around the rotor assembly.

In the preferred embodiment, the difference between the radius of the first surface and of the second surface provides an annular step between said first and second surfaces. The annular cross-sectional area of the step, calculated as a percentage of the total annular cross-sectional area of the rotor assembly, is preferably substantially equal to the percentage air flow removed via said bleed arrangement.

BRIEF DESCRIPTION OF THE DRAWINGS

Embodiments of the invention will now be described by way of example only, with reference to the accompanying drawings, in which.

DETAILED DESCRIPTION OF THE INVENTION

Figure 1:
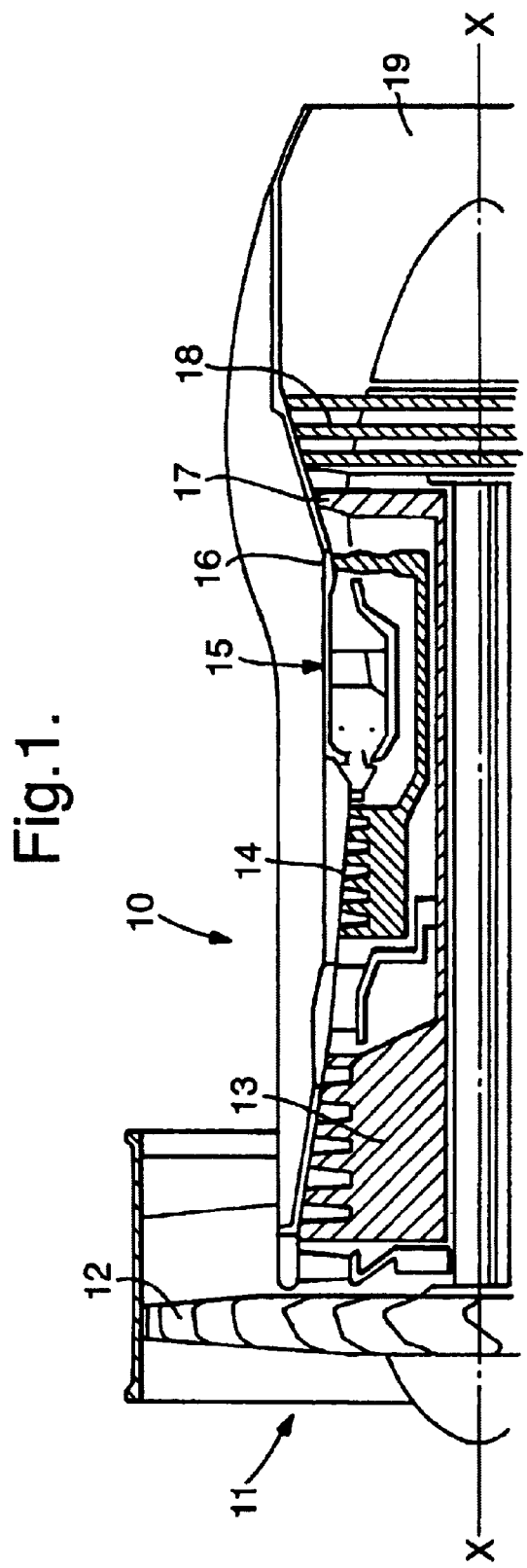
FIG. 1 is a sectional side view of the upper half of a gas turbine engine.

With reference to FIG. 1, a ducted fan gas turbine engine generally indicated at 10 has a principal axis X—X. The engine 10 comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and an exhaust nozzle 19.

The gas turbine engine 10 works in the conventional manner so that air entering the intake 11 is accelerated by the fan to produce two air flows: a first air flow into the intermediate pressure compressor 13 and a second air flow which provides propulsive thrust. The intermediate pressure compressor 13 compresses the air flow directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive, the high, intermediate and low pressure turbine 16, 17 and 18 before being exhausted through the nozzle 19 to provide additional propulsive, thrust The high, intermediate and low pressure turbines 16, 17 and 19 respectively drive the high and intermediate pressure compressors 14 and 13 and the fan 12 by suitable interconnecting shafts.

Figure 2:
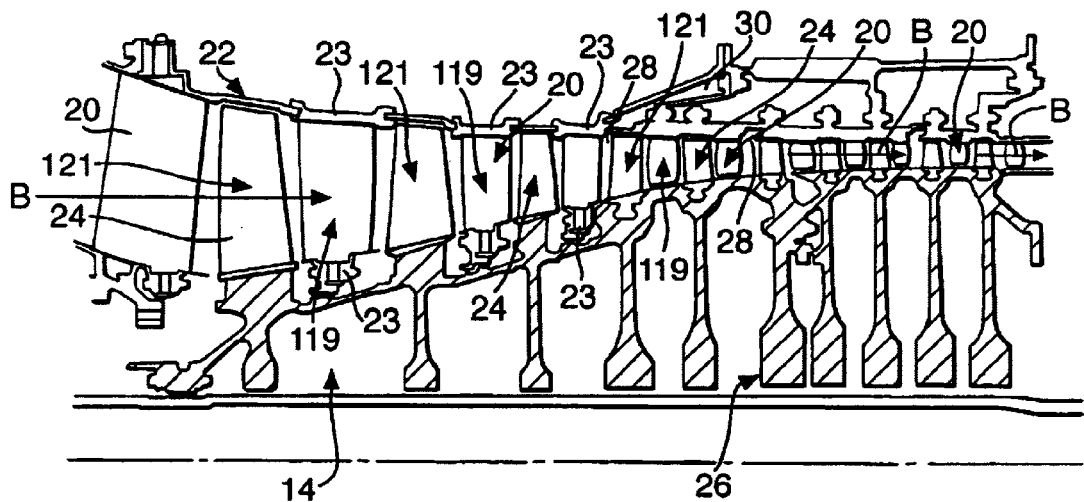
FIG. 2 is a sectional schematic side view of the upper half of a half of a high pressure compressor of the engine shown in FIG. 1.

Referring to FIG. 2, there is shown a schematic representation of the upper half of the high pressure compressor 14 which comprises a plurality of vane assemblies 119, each comprising an annular array of states vanes 20, each being fixedly mounted to a casing 22 provided radially outwardly of the stator vanes 20. Mounting means in the form of a platform 23 secures each vane 20 to the casing 22. The vane assemblies 119 alternate with a plurality of rotor blade assemblies 121, each comprising a plurality of rotor blades 24 mounted in an annular array on a rotary support member 26 in the form of a compressor disc. Each of the stator vanes 20 is provided to direct air onto the rotor blades at a desired angle.

Some of the vanes 20 are provided, or associated, with outlet means defining main bleed apertures 28. The main bleed apertures 28 provide an opening for bleed arrangements 30 which allow air to be bled from the main flow of air (indicated by the arrows B) through the compressor 14 for other purposes in the engine, for example cooling. The main flow of air leaves the high pressure compressor 14 shown in FIG. 2 at the downstream end on the right hand side to enter the combustor 15.

Figure 3:
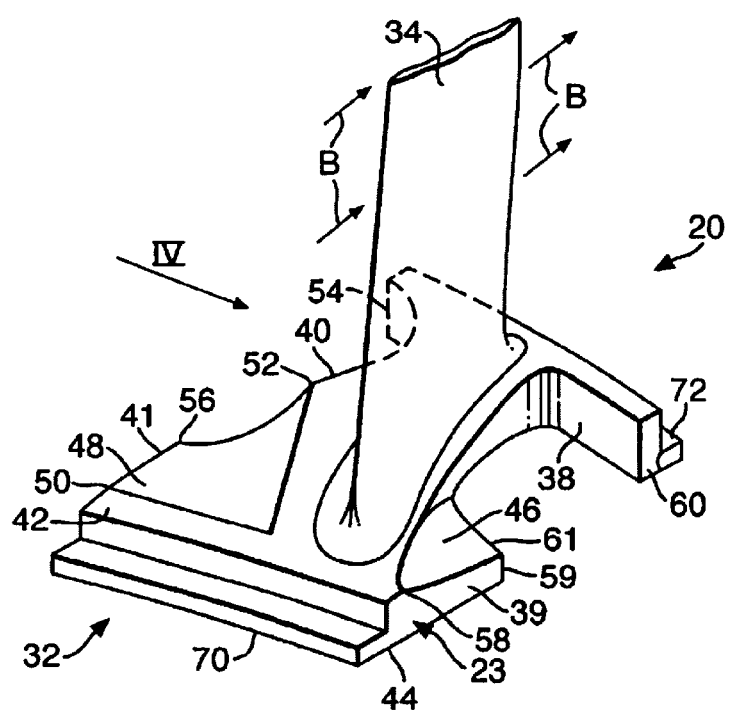
FIG. 3 is a perspective view of a part of a stator vane.
Figure 4:
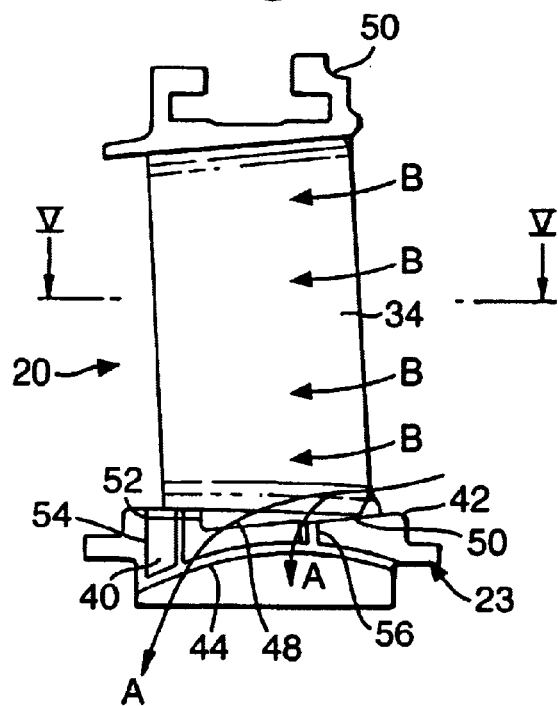
FIG. 4 is a side view along the line IV in FIG. 3 of the stator vane.
Figure 5:
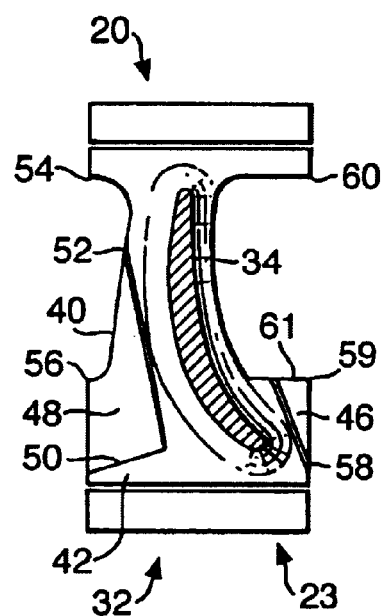
FIG. 5 shows a view along the lines V—V in FIG. 4.

Referring to FIGS. 3, 4 and 5 there is shown one of the stator vanes 20. FIG. 3 shows the radially outer end region 32 of the stator vans 20. The stator vane 20 comprises an aerofoil member 34 mounted on the platform 23. As discussed above, the platform 23 secures the vane 20 to the casing 22 of the high pressure compressor 14 The casing 22 and the platforms 23 include tongue and groove formations to allow the platforms 23 to be mounted on the casing 22. In the embodiments shown in FIGS. 3 to 8 each platform 23 includes tongue formation 70, 72 at the respective opposite up stream and downstream ends of the platform 23.

In FIGS. 3 to 5, the platform 23 defines recesses 38, 40 on either side of the aerofoil member 34, the recesses 38, 40 extending inwardly from respective side edges 39, 41 of the platform 23. When the vanes 20 are arranged in the compressor 14, with the platforms 23 of adjacent stator vanes 20 in abutment with each other, and the edges 39, 41 of adjacent platforms 23 in engagement with each other, the recess 38 in the platform 23 of one of the vanes 20 is aligned with the recess 40 in the platform 23 of the adjacent vane 20 to provide one of the main bleed apertures 28 which extends between the two platforms 23 of the two adjacent vanes 20 The main bleed aperture 28 allows air to be bled from the main flow to a bleed arrangement 30 which passes the air so bled to other parts of the engine 10, e.g. for cooling purposes, as described above.

The platform 23 comprises a radially inner first surface 42 from which the aerofoil member 34 extends and which faces inwardly of the compressor, and a radially outer second surface 44 which faces outwardly of the compressor. The main flow of gas through the compressor 14 is represented by the arrows B in FIG. 3. The platform 23 defines two ramps or inclined regions 46, 48, which slope from the first face 42 towards the second face 44 in the direction of flow of air through the engine 10 and serve to guide air through the bleed aperture 28 defined by the recesses 38, 40 of adjacent, abutting platforms 23. The ramps 46, 48 allow the flow of air through the aforesaid bleed apertures 28, as indicated by the arrows A in FIG. 4, to maintain a laminar flow therethrough, thereby limiting the pressure drop. The ramps 46, 48 are inclined to the main axis of the compressor 14 by about 7°.

As shown in FIGS. 3 to 5, the ramp 48 slopes from the upstream end region of the mounting member 23 at a line designated 50 in FIGS. 3 to 5 to a generally central region of the edge of the mounting member 23 at a point designated 52. The recess 40 extends from the downstream end region of the mounting member 23 at the corner designated 54 to a generally central region of the mounting member 23 at the corner designated 56 downstream of the line 50, generally midway along the ramp 48.

The ramp 46 and the recess 38 are provided on the opposite side of the aerofoil member 34 to the ramp 48 and the recess 40. The recess 39 extends from the downstream end region of the platform 23 at a corner designated 60 to a generally central region of the edge of the platform 23 at a corner designated 59. The ramp 46 extends from the upstream end region of the platform 23 at a point designated 58 to the upstream edge of the recess 39, defined by a line designated 61 in FIGS. 3 and 5.

Figure 6:
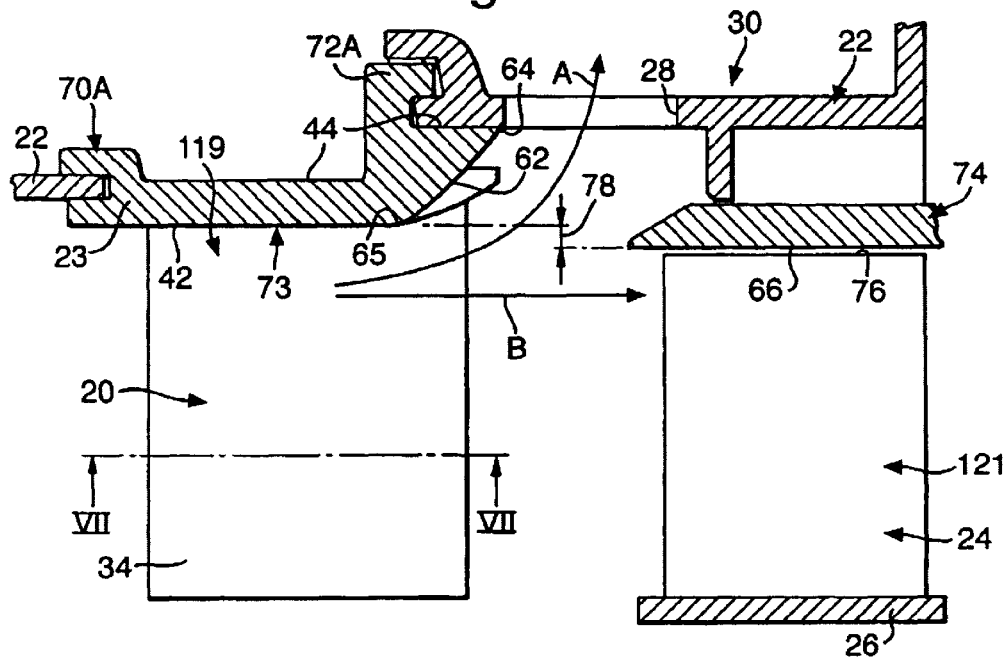
FIG. 6 in a schematic sectional side view of part of a compressor showing a further embodiment of a stator vane and a compressor blade.
Figure 7:
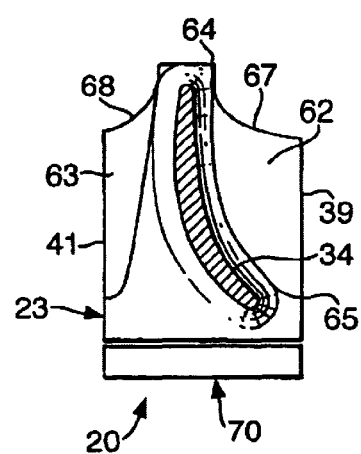
FIG. 7 is a view along the lines VII—VII of the stator vane shown in FIG. 6.

A further embodiment is shown in FIGS. 6 and 7, and comprises a stator vane 20, which includes generally the same features as shown in FIGS. 3, 4 and 5, and those have been designated with the same reference numerals. The stator vane 20 in the embodiment shown in FIGS. 6 and 7 includes two inclined regions or ramps designated 62, 63 on opposite sides of the aerofoil member 34. In this embodiment, each of the ramps 62, 63 extends to a respective recess 67 or 68 defined on opposite sides of the aerofoil member 34 inwardly from the downstream edge 64 of the platform 23 and inwardly of the respective side edges 39, 41 of the platform 23. As can be seen from FIGS. 6 and 7 the ramp 62 extends from the upstream edge region of the vane 20 at a point 65 to the edge of the recess 67 and the ramp 63 extends from the upstream edge region of the platform 23 at a point 69 to the edge of the recess 68.

The platform 23 includes an upstream groove formation 70A and a downstream groove formation 72A which, as shown, co-operate with the casing 22 to secure the vane 20 in place. When a plurality of vanes 20 are secured in this way to the casing 22 to form the annular stator vane assembly 119, the first faces 42 of each platform 23 together provide a first annular surface 73 surrounding the aerofoil members, 34 of the stator vanes 20.

FIG. 6 also shows a compressor blade 24 of a rotor blade assembly 121 mounted on the rotary support member 26. The casing 22 includes a portion 74 which surrounds the compressor blades 24 and provides a second surface 66, adjacent the radially outer tip 76 of the compressor blades 24.

As can be seen from FIG. 6, the first annular surface 73 provided by the combined first faces 42 of the platforms 23 faces inwardly of the stator vane assembly 119 and has a greater radius, relative to the principal axis X of the engine, than the radius of the second surface 66 surrounding the blades 24. Thus, an annular step 78 is provided between the first surface 73 surrounding the stator vanes 20 and the second surface 66 surrounding the rotor blades 24.

The gas flowing over the platforms 23 is of a laminar flow and FIG. 6 shows a pair of arrows designated A and B. The arrows A and B represent the two outermost layers of gas flowing over the platform 23. The arrow A represents the layer of gas adjacent the platform 23 which is bled from the main flow of gas guided by the ramps 62, 63 into the recesses 67, 68 into the main bleed apertures 28 defined in the casing 22. The air so bled off from the main flow of air is intended for use in another part of the engine 10.

The arrow B represents the layer of air flowing adjacent the layer represented by the arrow A, AS can be seen, the provision of the annular step 78 allows the layer of air represented by the arrow B to flow straight across from the vane 20 to the compressor blade 24. In the case of prior art compressors, the surface surrounding the stator vanes 20 and the surface surrounding the rotor blades 24 are of the same radius. This has the disadvantage that when the outermost layer of gas is bled off from the compressor, the adjacent layer moves radially outwardly to take its place. This results in a loss of pressure.

The presence of the annular step 78 provides the advantage in the above described embodiment that the layer of the gas represented by the arrow B does not need to deviate in direction and flow towards the surface 66. As a result, there is less of a drop in pressure. Thus, gas flows into the bleed arrangement 30 without disturbing the main flow of air through the high pressure compressor 19. The annular step 78 has a cross-sectional annular area, which is a percentage of the total annular cross-sectional area of the annulus of the high pressure compressor 14 at that point. This percentage is the same as the percentage volume of air removed via the bleed aperture 28 at the same point in the compressor 14.

Figure 8:
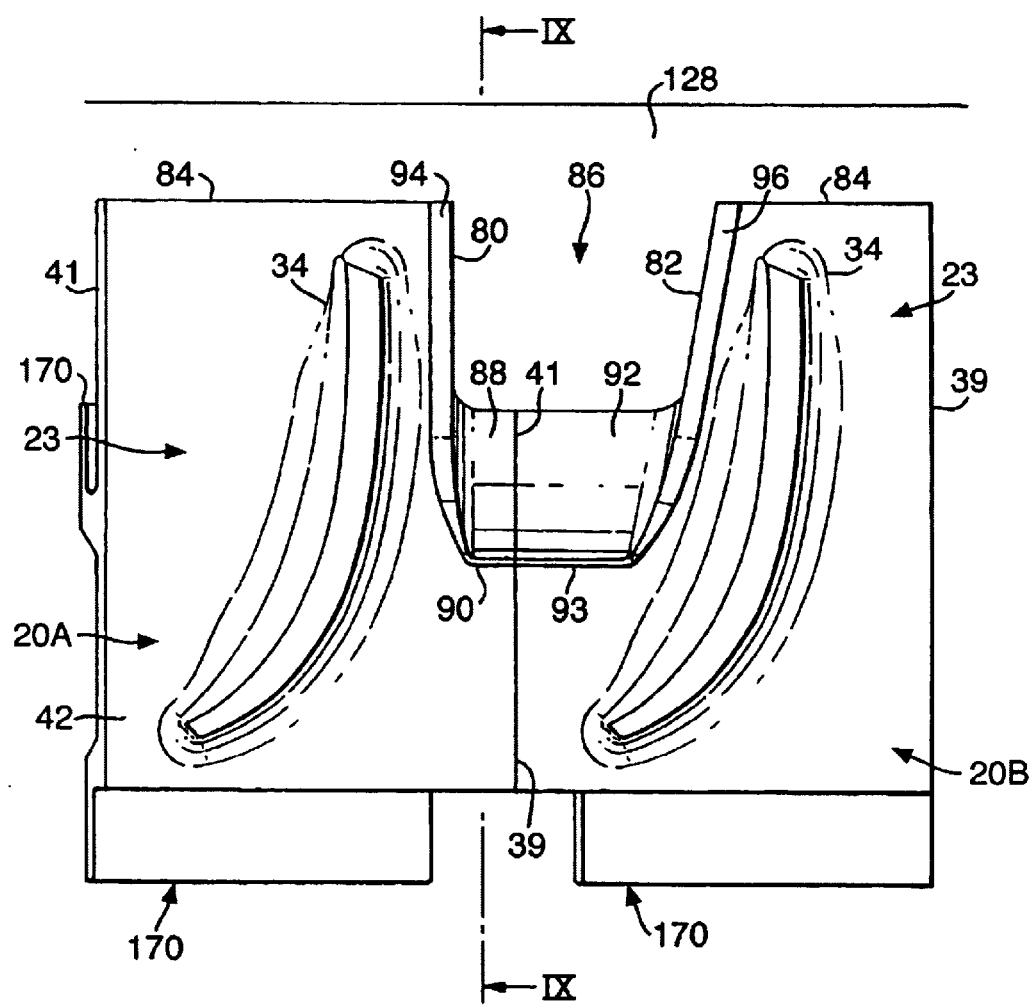
FIG. 8 is a plan view of two adjacent stator vanes, according to another embodiment.
Figure 9:
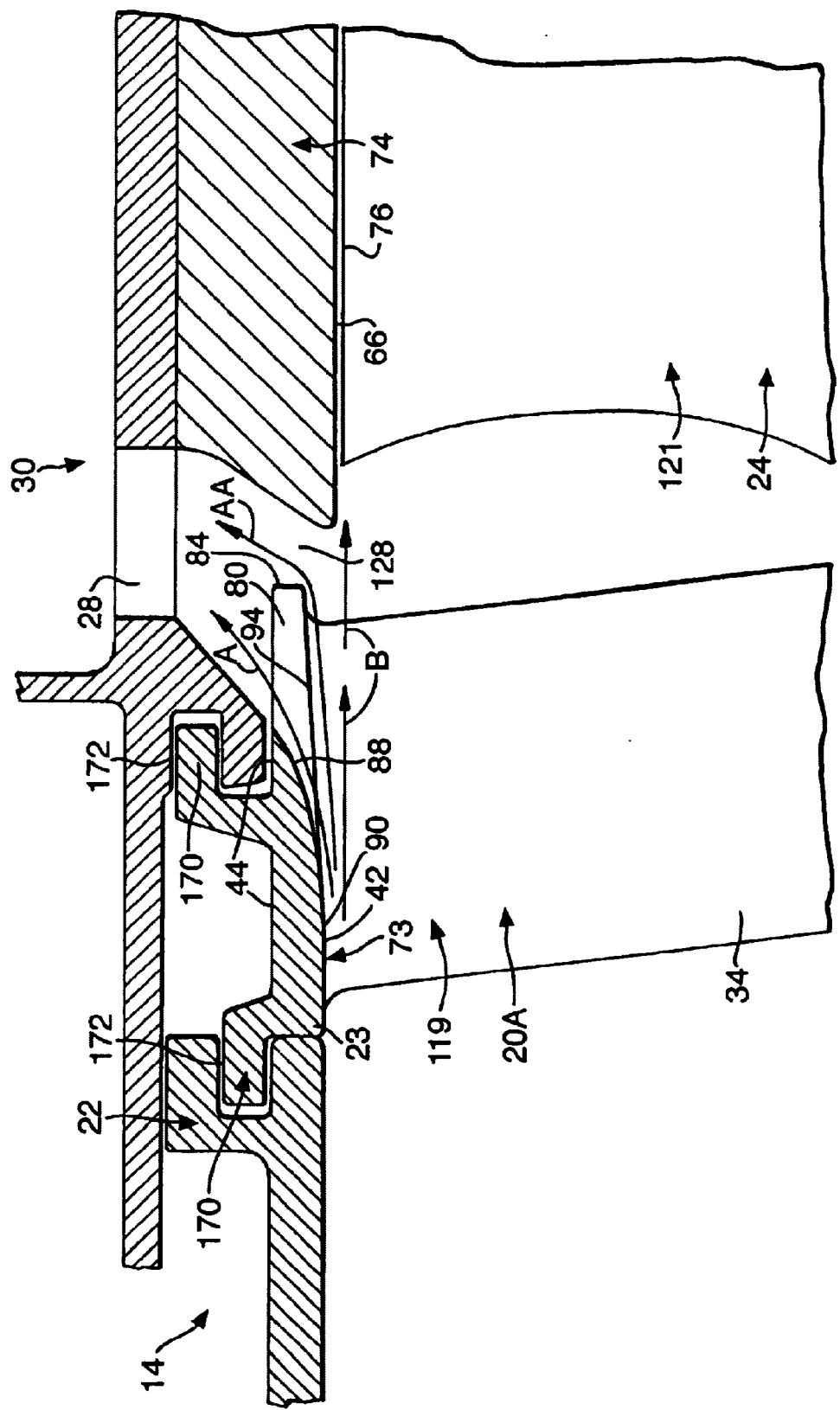
FIG. 9 is a circumferential side view of a high pressure compressor showing a stator vane as shown in FIG. 8.

Another embodiment is shown in FIGS. 8 and 9, and comprises a stator vane 20, which includes generally the same features as shown in FIGS. 6 and 7, and these have been designated with the same reference numerals.

The platform 23 of the stator vane 20A is provided with a first ramp 88 which extends from a region 119 on the radially inner face 42 of the platform 23 to the edge of the recess 80. As can be seen from FIG. 9, the first ramp 88 is curved, presenting a convex surface to the flow of air A passing through the aperture 80.

Referring to FIG. 8, it will be seen that there are two versions of the stator vane 20, one labelled 20A, and the other labelled 20B. Each of the stator vanes 20A and 20B comprises a single recess, designated respectively 80, 82. The recess 80 in the platform 23 of the stator vane 20A extends from the rear edge 84 thereof to the side edge 39. The recess 82 of the stator vane 20D extends from the rear edge 84 thereof to the side edge 41. Thus, when the two different versions of the stator vane 20, namely 20A and 20B are arranged adjacent to each other with the side edge 39 of the platform 23 of the stator vane 20A in abutment with the side edge 41 of the platform 23 of the stator vane 20B, the recesses 80, 82 are aligned with each other to define a larger bleed aperture 86. Each of the stator vanes 20A, 20B includes attachment formations 170 to attach the respective stator vane 20A, 20B to the casing 22 of the high pressure compressor 14. Referring to FIG. 9, there is shown the stator vane 20A incorporated into the high pressure compressor 14.

The other stator vane 20B is provided with a curved first ramp 92 which corresponds to but extends over a larger area than the ramp 88. The ramp 92 extends from a region 93 mid-way along the platform 23 of the stator vane 20B to the edge of the recess 82. The ramp 92 is curved in the same way, and to the same extent as the ramp 88. Both ramps 88 and 92 are of an elliptical configuration which as shown, provides a gentle upstream slope and a steeper downstream slope to provide a gradual transition to the change of direction of the air flow into the main bleed aperture 28.

In addition to the curved ramps 88 and 92, each of the platforms 23 of the respective stator vanes 20A and 20B includes a second inclined region in the form of a second ramp 94, 96 which extends between the respective first ramp 88, 92 and the respective aerofoil member 34. In FIG. 9, the ramp 94 is shown, but it will be appreciated that the ramp 96 of the stator vane 20B is of the same configuration. As can be seen from FIG. 9, air directed along the ramp 94 its shown by the arrow AA. The ramps 94 and 96 are generally straight and are inclined at an angle of substantially 3½° to the principal axis X of the engine Although in this embodiment the angle of inclination of the ramps 94 and 96 is substantially 3½°, it will be appreciated that smaller or larger angles could be used.

The air shown by the arrow A is guided by the first ramps 88, 92 to pass through the bleed aperture 28 in the casing 22. The second ramp 94, 96 guides the air as shown by the arrow AA into a subsidiary bleed aperture 128 at the rear of the platform 23. The subsidiary bleed aperture 128 extends around the whole circumference of the high pressure compressor 14 and allows the amount of bleed air to be increased.

The formations 170 which secure the respective stator vanes 20A, 205 to the casing comprise co-operating formations in the form of tongues which co-operate with respective grooves 172 defined in the casing 22.

Figure 10:
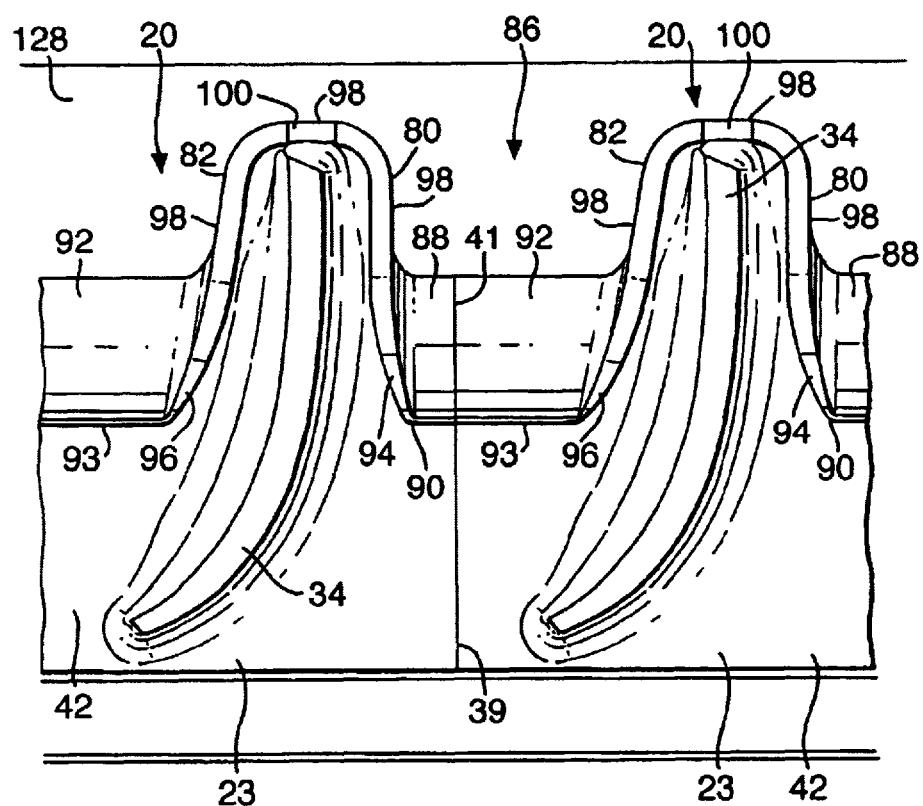
FIG. 10 is a plan view of two adjacent stator vanes according to a further embodiment.

Referring to FIG. 10, there is shown a further embodiment, similar to FIG. 8, in which two adjacent vanes 20 are shown. The vanes 20 include many of the same features as the vanes 20A, 20B in FIGS. 8 and 9, and these have been designated with the same reference numeral.

The vanes 20 shown in FIG. 10 differ from the vanes 20A, 20B in that the vanes 20 are the same as each other, with each vane having two first ramps 88, 92, one on each side of the aerofoil member 34. Each vane 20 further includes two second ramps 94, 96 between the respective first ramps 88, 92 and the aerofoil member 34. An edge 98 extends along each of the second ramps 94, 96. The edge 98 is rounded to allow a smooth flow of gas across it.

A downstream section 100 extends across the downstream end of the mounting member 23, behind the respective aerofoil member 34. The downstream section 100 extends between both of the second ramps 94, 96. A rounded edge 98 extending along the downstream section 100 also extends between the two second ramps 94, 96.

The downstream section 100 and its edge 98 allow some of the gas flowing around the aerofoil member 34 to flow smoothly into the Subsidiary bleed aperture 128.

Formations similar to the formations 170 can be provided on the embodiment shown in FIG. 10 to secure the stator vanes 20 to the casing 22.

Figure 11:
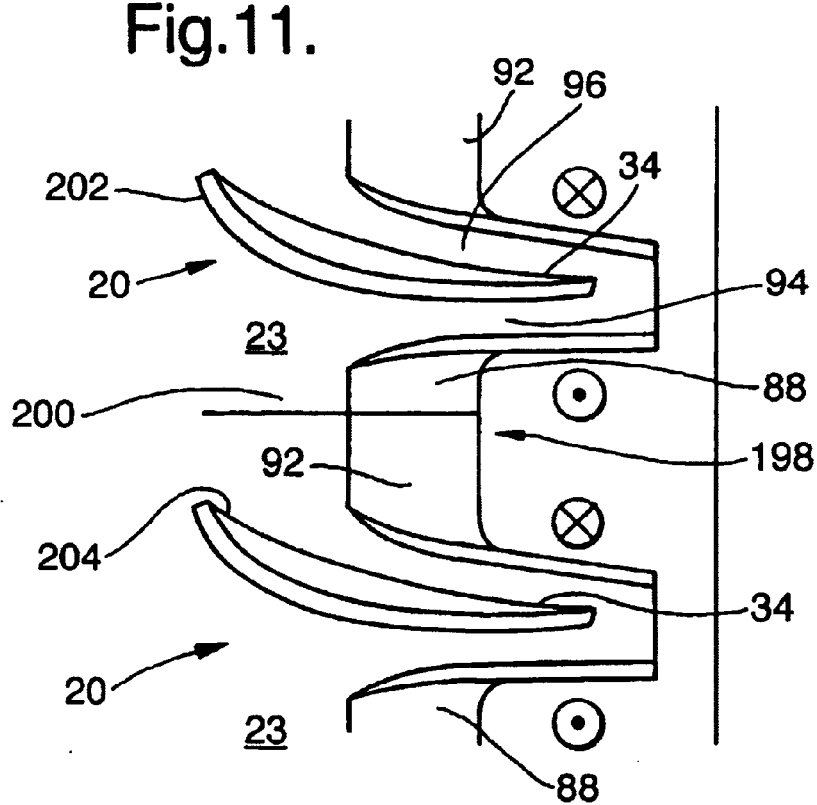
FIG. 11 is a plan view of a further embodiment of two stator vanes similar to those shown in FIG. 8.

A problem with the stator vanes shown in FIGS. 8 and 10 is illustrated by FIG. 11. The vanes of FIG. 11 have many features in common with FIG. 8, and like numerals have been used to identify these features. As in FIG. 10, to two adjacent vanes 20 are shown. Each vane has a 23 from which an aerofoil 34 extends, and includes two first ramps 88, 92 which are so arranged as to cooperate, when two vanes 20 are disposed adjacent to each other, to define a single inclined region 198 leading into the bleed aperture 86. The platform 23 extends along each side of the aerofoil 34 to form two second ramps 94, 96.

In use, because of the static pressure field created by the aerofoils 34, the pressure in the region 200 between two adjacent aerofoils 34 is not uniform. It will be lower near to the convex aerofoil surface 202 (the suction surface) than near to the concave aerofoil surface 204 (the pressure surface). This pressure differential causes gas to flow preferentially into the aperture 86 in the region indicated by Ⓧ, and to leak out of the aperture 86 and back into the main gas stream, in the region indicated by ☉. This recirculation degrades the performance of the compressor.

Figure 12:
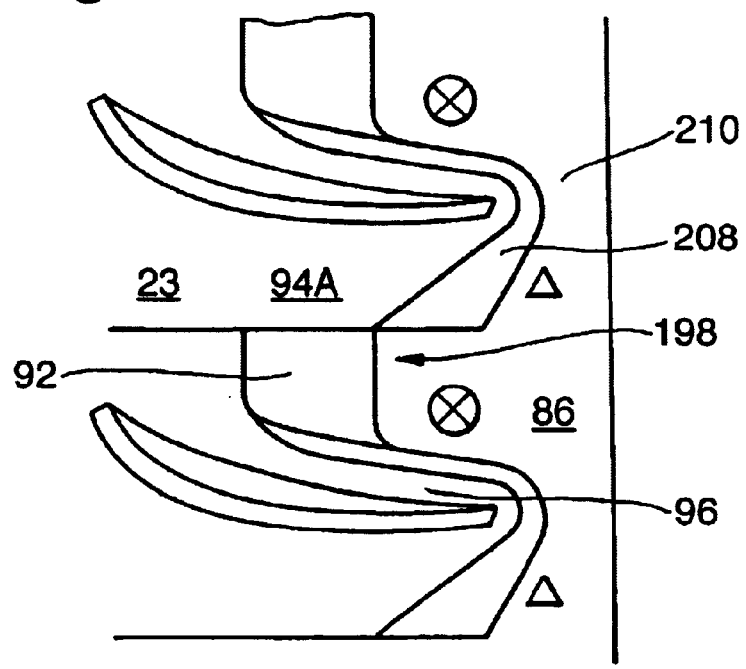
FIG. 12 is a plan view of a still further embodiment of two stator vanes similar to those shown in FIG. 8.

Referring now to FIG. 12, a modification of the vane arrangement is shown that addresses this problem. Here the second ramp (now indicated as 94A) is enlarged in a circumferential direction, so that the region indicated in FIG. 11 by ☉ is obscured The size of the inclined region 198 is thus reduced by approximately one third, compared with the embodiment of FIG. 11. An inclined region 208 is provided downstream of the second ramp 94A. This aids the flow of gas into the bleed aperture 86.

It can be seen from FIG. 12 that, in this embodiment, the second ramp 94A is formed entirely within one vane, and the first ramp 92 is formed entirely within the adjacent vane. It will be apparent to a skilled person that other equivalent arrangements are possible, in which the second ramp 94A and the first ramp 92 are differently arranged between the one vane and the other.

A further improvement in the compressor performance can be obtained if the second ramp 96 is made as small as possible. The region indicated by Ⓧ then extends as close as possible to the pressure surface 204 of the aerofoil 34.

Besides the alleviation of the recirculation problem set out above, the configuration illustrated in FIG. 12 has a further advantage. At different points in the operating envelope of a gas turbine engine, different amounts of bleed air are required to meet the needs of the engine and aircraft. Typically, bleed flow may vary between zero and about 20% of the total air flow through the engine.

The bleed aperture configuration shown in FIG. 11 performs well, considered over the whole operating envelope, but it does suffer from the leakage and recirculation referred to above. The compressor degradation caused by this is worst at relatively low bleed flows, up to about 6% of core flow.

The configuration illustrated in FIG. 12 mitigates the recirculation problem at these low bleed flows, because the presence of the second ramp 94A obscures the region of relatively low pressure (indicated in FIG. 11 by ☉) and forces air to flow into the bleed aperture 86 via the first ramp 92. There is still a slight tendency to recirculation in the regions indicated in FIG. 12 by Δ and 210, but this is relatively small because the static pressures in these areas are both higher and more uniform than in the region ☉ of FIG. 11.

At higher bleed flows, air can enter the bleed aperture 86 via the regions Δ and 210 as well as via the first ramp 92. An additional contoured or inclined ramp 208 is provided at the downstream end of the second ramp 94A, to assist the flow of air into the bleed aperture 86.

Various modifications can be made without departing from the scope of the invention.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A vane for a rotor arrangement of a gas turbine engine, the rotor arrangement having a main axis, the vane comprising a mounting member and an aerofoil member extending from the mounting member, the mounting member including an inclined region to guide gas flowing over the mounting member into a bleed arrangement wherein the angle of said inclined region is inclined relative to the main axis of the rotor arrangement at an angle of between substantially 5° and substantially 30°.

2. A vane accordingly to claim 1 wherein the inclined region is generally planar.

3. A vane according to claim 1 wherein the inclined region is curved and presents a convex face towards said aerofoil member.

4. A vane according to claim 3 wherein the inclined region is substantially elliptical in profile.

5. A vane according to claim 1 wherein the mounting member defines a recess to allow gas to enter the bleed arrangement, and the inclined region constitutes an entry region to the recess to guide said gas into the recess.

6. A vane for a rotor arrangement of a gas turbine engine, the rotor arrangement having a main axis, the vane comprising a mounting member and an aerofoil member extending from the mounting member, the mounting member including an inclined region to guide gas flowing over the mounting member into a bleed arrangement wherein the angle of said inclined region is inclined relative to the main axis of the rotor arrangement wherein said angle is between substantially 7° and substantially 13°.

7. A vane for a rotor arrangement of a gas turbine engine, the rotor arrangement having a main axis, the vane comprising a mounting member and an aerofoil member extending from the mounting member, the mounting member including an inclined region to guide gas flowing over the mounting member into a bleed arrangement wherein the mounting member defines a recess to allow gas to enter the bleed arrangement, and the inclined region constitutes an entry region to the recess to guide said gas into the recess wherein the mounting member defines two of said recesses, each on respective opposite sides of the aerofoil member, and the mounting member further includes two of said inclined regions, each associated with a respective one of the recesses.

8. A vane according to claim 7 wherein the recesses and the inclined regions are provided on the mounting member so that, when said vane is disposed in abutment with an adjacent further one of said vanes, the recesses on the respective vanes are aligned, and the inclined regions are aligned to provide a single inclined region which extends across the abutting mounting members.

9. A vane according to claim 8 wherein the mounting member is provided with a second inclined region arranged between the first inclined region and the aerofoil member.

10. A vane according to claim 9 wherein the second inclined region is in the form of a ramp, which slopes from the first surface of the mounting member towards the second face.

11. A vane according to claim 10 wherein the second inclined region terminates between said first and second surfaces.

12. A vane according to claim 10 wherein the second inclined region slopes from the first surface towards the second surface in a downstream direction relative to the direction to the intended flow of gas across the mounting member.

13. A vane according to claim 9 wherein the second inclined region is inclined relative to the main axis of the rotor arrangement.

14. A vane according to claim 9 wherein the second inclined region extends from a region between the upstream and downstream edges of the mounting member towards the downstream edge of the mounting member.

15. A vane according to claim 9 wherein the second inclined region makes an angle of between substantially 0° and substantially 10° with the main axis of the rotor arrangement.

16. A vane according to claim 9 wherein an edge extends between the second inclined region and the first incline region, the edge being rounded.

17. A vane according to claim 9 wherein the second inclined region extends to the downstream edge of the mounting member.

18. A rotor arrangement for a gas turbine engine, the arrangement comprising a vane assembly comprising a plurality of vanes according to claim 17 arranged in an annular array, the arrangement further comprising annular structure downstream of the vane assembly, wherein the annular structure defines a subsidiary bleed aperture downstream of the second inclined regions of the vanes.

19. A rotor arrangement according to claim 18 wherein the subsidiary bleed aperture is a single annular aperture.

20. A rotor arrangement according to claim 18 wherein the subsidiary bleed aperture comprises a plurality of apertures arranged in an annular array.

21. A vane according to claim 9 wherein the second inclined region includes a downstream section extending across the downstream end of the mounting member.

22. A vane according to claim 21 wherein the vane includes two of said second inclined regions, a respective one being provided on each side of the aerofoil member and said downstream section extends between both of said second inclined regions.

23. A vane according to claim 22 wherein each of said second inclined regions makes an angle of between substantially 0° and 10° with the main axis of the rotor arrangement.

24. A vane according to claim 21 wherein the downstream edge of said downstream section is rounded.

25. A vane according to claim 9 wherein the second inclined region is extended, in a generally circumferential direction, in the region of the aerofoil suction surface, to an extent sufficient to reduce substantially the recirculation of air from the recess.

26. A vane as claimed in claim 25 wherein the second inclined region is extended over substantially one-third of the circumferential distance between adjacent aerofoils.

27. A vane as claimed in claim 25 wherein the second inclined region has an inclined region at its downstream end to assist the flow of gas into the bleed aperture, particularly at higher bleed flows.

28. A rotor arrangement for a gas turbine engine, the arrangement comprising a vane assembly comprising a plurality of vanes arranged in an annular array, each vane having an aerofoil member, the arrangement further including a rotor blade assembly downstream of the vane assembly, the rotor blade assembly comprising a plurality of rotor blades arranged in an annular array on a rotary support member, and an annular surface arrangement extending around the aerofoil members and the rotor blade assembly, the surface arrangement defining outlet means upstream of the rotor blade assembly through which gas can flow to a bleed arrangement, the surface arrangement including a first surface extending around the aerofoil members and a second surface extending around the rotor blade assembly, wherein the radius of the first surface is greater than the radius of the second surface wherein the difference between the radius of the first surface and of the second surface provides an annular step between said first and second surfaces, the annular cross-sectional area of the step, calculated as a percentage of the total annular cross-sectional area of the rotor assembly at the step, is substantially equal to the percentage volume of air flow removed via said bleed arrangement.

* * * * *